1-ACYL-2-ALKYL-HYDRAZINE DERIVATIVES

Hugo Gutmann, Birsfelden, Otto Straub, Bottmingen, and Paul Zeller, Neuallschwil, Switzerland, assignors to Hoffmann-La Roche Inc., Nutley, N.J., a corporation of New Jersey
No Drawing. Filed June 30, 1958, Ser. No. 745,275
Claims priority, application Switzerland July 3, 1957
7 Claims. (Cl. 260—561)

This invention relates to novel substituted acid hydrazides of the general formula $$R_1\text{—CO—NH—NH—}R_2 \qquad (I)$$

wherein $R_1$ represents an acylclic hydrocarbon radical carrying at least one substituent selected from the group consisting of halogen, hydroxy, alkoxy containing not more than 4 carbon atoms and alkylmercapto containing not more than 4 carbon atoms, and $R_2$ represents a member selected from the group consisting of lower alkyl and phenyl lower alkyl, and to the salts thereof.

In the above Formula I the substituted acyclic hydrocarbon radical represented by $R_1$ may be a saturated or unsaturated, straight-chained or branched aliphatic hydrocarbon radical.

The compounds of Formula I may be synthesized by several methods. The preferred method, which constitutes a particular feature of this invention, consists in condensing an acid of the general formula $$R_1\text{—COOH} \qquad (II)$$

with a substituted hydrazine of the general formula $$H_2N\text{—NH—}R_2 \qquad (III)$$

$R_1$ and $R_2$ in Formulae II and III having the same meaning as in Formula I.

in the presence of an N,N'-disubstituted carbodiimide and, if desired, converting the condensation product into a salt.

According to this process, an acid of Formula II or its salts, e.g., the alkali metal salts, are condensed with a substituted hydrazine of Formula III in the presence of a carbodiimide, without preliminary conversion of this acid or its salts into more reactive compounds, such as the esters, halides, amides, and the like. The N,N'-disubstituted carbodiimides used as condensing agents may be obtained, e.g., by treating disubstituted urea derivatives with p-toluene-sulfonyl chloride in pyrridine. The corresponding urea derivatives are recovered after the condensation. If suitably substituted carbodiimides are used, e.g., N,N'-dicyclohexyl carbodiimide, urea derivatives are obtained as by-products which may easily be separated from the reaction product. The reaction may, e.g., be carried out at a temperature between 0 and 50° C., preferably at room temperature or at a temperature slightly above room temperature. Advantageously, a solvent is used for the reaction. Solvents which may be used for this purpose include organic solvents, e.g., methylene chloride, chloroform, dioxane, tetrahydrofuran, dimethylformamide or acetonitrile, as well as water.

The compounds of this invention may also be produced by condensing a reactive functional derivative of an acid of the above Formula II, such as e.g., an ester, halide, anhydride or amide thereof, with a substituted hydrazine of the above Formula III. The condensation is preferably effected by heating together the reaction components.

A further method for the preparation of the novel substituted acid hydrazides consists in heating a salt formed from an acid of the above Formula II and a substituted hydrazine of the above Formula III.

Still another method of preparing the products of the invention consists in reacting the hydrazide of an acid of the above Formula II with a carbonyl compound and reducing simultaneously or subsequently the resulting hydrazone of the carbonyl compound. The reduction may be carried out by catalytic hydrogenation in an inert solvent and in the presence of catalysts, such as platinum, palladium-on-charcoal, and the like, or by reaction with lithium aluminium hydride. A modification of this method consists in treating the hydrazone formed with a Grignard compound, preferably methyl- or ethyl-magnesium halide, and hydrolyzing the product thus formed. Carbonyl compounds which may be used in this method include, e.g., acetone, methyl ethyl ketone and benzaldehyde.

According to this invention, the following compounds may, e.g., be obtained:

1-(Hydroxyacetyl)-2-iso-propyl-hydrazine, 1-(hydroxyacetyl)-2-benzyl-hydrazine, 1-(α-hydroxypropionyl)-2-tert.-butyl-hydrazine, 1-(α-hydroxypropionyl)-2-iso-propyl-hydrazine, 1-(α-hydroxypropionyl)-2-benzyl-hydrazine, 1-(α-hydroxypropionyl)-2-phenylethyl-hydrazine, 1-(γ-hydroxybutyryl)-2-phenylethyl-hydrazine, 1-(γ-hydroxybutyryl)-2-sec.-butyl-hydrazine, 1-(methoxyacetyl)-2-iso-propyl-hydrazine, 1-(ethoxyacetyl)-2-benzyl-hydrazine, 1-(ethoxyacetyl)-2-iso-propyl-hydrazine, 1-(diethoxyacetyl)-2-iso-propyl-hydrazine, 1-(diethoxyacetyl)-2-benzyl-hydrazine, 1-(β-hydroxypropionyl)-2-iso-propyl-hydrazine, 1-(2-ethoxypropionyl)-2-iso-propyl-hydrazine, 1-(α-diethoxypropionyl)-2-iso-propyl-hydrazine, 1-(α-methylmercaptopropionyl)-2-iso-propyl-hydrazine, 1-(γ-methylmercaptobutyryl)-2-iso-propyl-hydrazine, 1-(chloracetyl)-2-iso-propyl-hydrazine and 1-(β-chlorocrotonyl)-2-iso-propyl-hydrazine.

A preferred group of compounds of the formula $R_1$—CO—NH—NH—$R_2$ includes those substituted acid hydrazides wherein $R_1$ is a lower aliphatic hydrocarbon radical having from 1 to 4 carbon atoms which is substituted by at least one hydroxy or alkoxy group and $R_2$ is the isopropyl or benzyl radical; particularly preferred members of this group include the substituted hydrazides derived from lactic acid and dialkoxyacetic acids, especially diethoxyacetic acid.

The substituted acid hydrazides obtained according to the processes of this invention form well-defined salts with inorganic acids, for example with hydrohalic acids, such as hydrochloric acid, hydrobromic acid and hydroiodic acid; with other mineral acids, such as sulfuric acid, phosphoric acid and nitric acid; as well as with organic acids, such as tartaric acid, citric acid, camphorsulfonic acid, ethanesulfonic acid, salicylic acid, ascorbic acid, maleic acid, mandelic acid, and the like. Preferred salts are the hydrohalides, especially the hydrochlorides. The acid addition salts are conveniently prepared by reacting the substituted acid hydrazide with an excess of the appropriate acid, preferably in an inert solvent.

The compounds of this invention are monoamine oxidase inhibitors, that is, they inhibit the activity of monoamine oxidase which effects the deactivation of physiological regulators such as serotonin, tryptamine, epinephrine, etc., and stimulate the central nervous system. They are useful in psychotherapy for relief of disturbed or depressed states. They are also useful for increasing weight in cases where cachexia is present. The free hydrazine compound or a medicinally acceptable acid addition salt thereof may be administered orally or parenterally in conventional solid or liquid dosage forms such as tablets, capsules, injectables, etc., comprising therapeutic doses incorporated in a conventional solid or liquid vehicle with or without excipients.

The following examples are illustrative of the invention. All temperatures are stated in degrees Centigrade.

EXAMPLE 1

1-Methoxyacetyl-2-Iso-Propyl-Hydrazine 8.8 g. of methoxyacetic acid and 10.1 g. of triethylamine were dissolved in 150 ml. of acetonitrile. After addition of 11.05 g. of iso-propylhydrazine monohydrochloride the mixture was stirred at room temperature for one hour, and thereafter 20.7 g. of N,N'-dicyclohexyl carbodiimide were added to the reaction mixture which was then stirred for a further 3 to 4 hours, while maintaining the reaction temperature between 25° and 30° by intermittent cooling. The precipitated dicyclohexyl urea was filtered off, and the filtrate was concentrated in vacuo at a temperature not exceeding 60°. The residue was extracted with ether, whereby triethylamine hydrochloride remained undissolved. The ethereal solution was extracted first with saturated sodium bicarbonate solution and then portionwise with 70 ml. of 2 N hydrochloric acid. The combined hydrochloric acid extracts were adjusted to a pH between 7 and 8 by means of concentrated caustic soda solution, saturated with common salt and extracted several times with ether. After removal of the solvent from the combined and dried ethereal extracts there was obtained 1-methoxyacetyl-2-iso-propyl-hydrazine, $n_D^{25}=1.4587$; B.P. 105–106° at 12 mm. Hg.

EXAMPLE 2

1-(α-Methylmercapto-Propionyl)-2-Iso-Propyl-Hydrazine 11.0 g. of iso-propylhydrazine monohydrochloride, 10.1 g. of triethylamine and 12.0 g. of α-methylmercapto-propionic acid were dissolved in 170 ml. of methylene chloride. To the resulting solution there was added within about 40 minutes and with stirring a solution of 20.4 g. of N,N'-dicyclohexyl carbodiimide in 30 ml. of methylene chloride, while maintaining the reaction temperature between 30° and 35° by cooling. The mixture was then stirred for a further 4 hours at room temperature, and the precipitated dicyclohexyl urea was separated. The filtrate was washed with 3 portions of saturated sodium chloride solution and then extracted with 3 N hydrochloric acid. The resulting hydrochloric acid solution was neutralised with solid sodium bicarbonate and then extracted with ether. After evaporation of the ether the residue was distilled in a high vacuum to obtain a main fraction distilling at 88°/0.1 mm. Hg. The distillate crystallised after a short time on standing. This product was recrystallised from high-boiling petroleum ether to obtain 1-(α-methylmercapto-propionyl) - 2 - iso - propyl-hydrazine in the form of colourless crystals melting at 77–78°.

By substituting 14 g. of γ-methylmercapto-butyric acid for the α-methylmercapto-propionic acid in Example 2, there was obtained 1-(γ-methylmercapto-butyryl)-2-iso-propyl-hydrazine which was purified by distillation in a high vacuum; B. P. 90–93°/0.01 mm. Hg; M.P. 30–31°.

EXAMPLE 3

1-(β-Ethoxypropionyl)-2-Iso-Propyl-Hydrazine 44 g. of ethyl β-ethoxypropionate were mixed with 21 g. of hydrazine hydrate and the mixture was heated for 2 hours at 100°. On distillation of the reaction mixture there was obtained β-ethoxypropionyl hydrazide as the main fraction at 80°/0.005 mm. This hydrazide was converted into 1-(β-ethoxypropionyl)-2-iso-propylidene-hydrazine melting at 48.5 to 50.5° by boiling with acetone. After addition of platinum catalyst to a solution of this hydrazone in ethanol the mixture was shaken with hydrogen at room temperature and atmospheric pressure until the hydrogen absorption ceased. The catalyst was filtered off, the filtrate concentrated and the residue distilled in a high vacuum. 1-(β-ethoxypropionyl)-2-iso-propyl-hydrazine was obtained as a fraction boiling at 65°/0.03 mm. Hg. On cooling this hydrazine solidified; M.P. 31.5–32.5°; $n_D^{25}=1.4506$.

Methyl methoxyacetate was substituted for the ethyl β-ethoxypropionate in Example 3 and converted into methoxyacetic acid hydrazide (M.P. 50–51°; B.P. 71° at 0.01 mm. Hg) which yielded the corresponding 1-(methoxyacetyl) - 2 - iso-propylidene-hydrazine (M.P. 73–74°, after recrystallisation from a mixture of acetone and petroleum ether). From the latter there was obtained 1-(methoxyacetyl) - 2 - iso-propyl-hydrazine (B.P. 105–106°/12 mm. Hg; $n_D^{24}=1.4587$) which solidified at lower temperatures.

EXAMPLE 4

1-(β-Hydroxypropionyl)-2-Iso-Propyl-Hydrazine 160.8 g. of β-propiolactone were mixed with 650 ml. of acetonitrile and reacted with 122 g. of 100% hydrazine hydrate. The reaction mixture was concentrated and the residue recrystallised from alcohol to obtain β-hydroxypropionyl-hydrazine melting at 102.5 to 104°. By heating this product with excess acetone and concentrating the resulting reaction mixture there was obtained 1-(β-hydroxypropionyl) - 2 - iso-propylidene-hydrazine which, after recrystallisation from acetone, melted at 94–95.5°. A solution of this hydrazone in ethanol was hydrogenated in the presence of platinum catalyst in the manner described in Example 3 to obtain 1-(β-hydroxypropionyl)-2-iso-propyl-hydrazine which crystallised from ethyl acetate in the form of fine colourless needles of M.P. 99–100°.

EXAMPLE 5

1-(Hydroxyacetyl)-2-Iso-Propyl-Hydrazine 100 g. of glycollic acid were heated with 380 ml. of methanol and 300 g. of concentrated sulphuric acid to form methyl glycollate of B.P. 42–44°/12 mm. Hg; $n_D^{25}=1.4120$. 100 g. of this ester were heated with a slight excess of hydrazine hydrate over the calculated amount. The semi-solid reaction product was purified by recrystallisation from alcohol. The resulting glycollic acid hydrazide melted at 91.5–92.5°. This hydrazide was boiled with excess acetone to form 1-(hydroxyacetyl)-2-iso-propylidene-hydrazine of M.P. 113–115°. 20 g. of this hydrazone were dissolved in ethanol and hydrogenated at room temperature and atmospheric pressure after addition of 0.1 g. of platinum catalyst. After the hydrogen absorption had ceased, the catalyst was filtered off and the filtrate was concentrated in vacuo. The resulting crude 1-(hydroxyacetyl)-2-iso-propyl-hydrazine was recrystallized from ethyl acetate to yield colourless prisms of M.P. 96–97°.

γ-Hydroxybutyric acid hydrazide was substituted for the glycollic acid hydrazide in Example 5 to form 1-(γ-hydroxybutyryl)-2-iso-propyl-hydrazine of M.P. 69–71°.

EXAMPLE 6

1-(α-Hydroxypropionyl)-2-Iso-Propyl-Hydrazine 15 g. of lactic acid hydrazide were boiled for 3 hours in 150 ml. of acetone. The reaction mixture was then concentrated to dryness and the yellowish sticky residue, after having been dried for a short time on a porous clay plate, was boiled once more than 2 hours with 100 ml. of acetone. Again the reaction mixture was concentrated and the residue dried. The dry residue was recrystallised from benzene or ethyl acetate. 24 g. of the resulting 1-(α-hydroxypropionyl)-2-iso-propylidene-hydrazine, M.P. 86–91°, were hydrogenated at room temperature and atmospheric pressure in 700 ml. of ethanol in the presence of platinum catalyst until the calculated amount of hydrogen (1 mole per mole of the substance to be hydrogenated) had been absorbed. After removal of the catalyst the solution was concentrated to dryness in vacuo. The residue was recrystallised from ethyl acetate. There were thus obtained 15 g. of 1-(α-hydroxypropionyl)-2-iso-propyl-hydrazine of M.P. 102–103°.

EXAMPLE 7

1-(α-Hydroxypropionyl)-2-Phenethyl-Hydrazine 20.8 g. of lactic acid hydrazide were boiled for 1 hour with 62 g. of 50% alcoholic phenylacetaldehyde solution and 20 ml. of ethanol. The reaction mixture was allowed to stand in the cold for several hours. The precipitated product was filtered by suction and recrystallised from a mixture of ethyl acetate and ethanol (6:1). 10.3 g. of the resulting 1-(α-hydroxypropionyl)-2-(β-phenylethylidene)-hydrazine, M.P. 160–163°, were hydrogenated in 500 ml. of ethanol in the presence of 0.3 g. of platinum oxide at room temperature and atmospheric pressure until the calculated amount of hydrogen had been absorbed. The catalyst was filtered by suction and the filtrate was concentrated to dryness. The residue was recrystallised from benzene. The resulting 1-(α-hydroxypropionyl)-2-phenethyl-hydrazine had a melting point of 111.5–114°.

EXAMPLE 8

1-Diethoxyacetyl-2-Iso-Propyl-Hydrazine 168 g. of ethyl diethoxyacetate were mixed with 170 ml. of alcohol and 100 g. of hydrazine hydrate (100%), and the mixture was refluxed for 6 hours. The residue was then distilled in vacuo to yield 130 g. of diethoxyacetic acid hydrazide of B.P. 103°/0.02 mm. Hg; $n_D^{22}=1.4635$. On standing at room temperature this product solidified. 20 g. of this hydrazide were refluxed for 1 hour with 20 ml. of acetone. The excess acetone was then distilled off. The residue was dissolved in 50 ml. of alcohol, and the solution was hydrogenated at room temperature and atmospheric pressure in the presence of a small amount of platinum catalyst until the hydrogen absorption ceased. The catalyst was filtered off, the filtrate was concentrated in vauco and the residue was distilled. There was thus obtained 1-diethoxyacetyl-2-iso-propyl-hydrazine, B.P. 78–80°/0.1 mm. Hg; $n_D^{23}=1.4470$.

EXAMPLE 9

1-Diethoxyacetyl-2-Benzyl-Hydrazine 22.3 g. of the diethoxyacetic acid hydrazide prepared according to Example 8 were heated for one hour on the water bath with 50 ml. of alcohol and 16 g. of benzaldehyde. The reaction product was then hydrogenated at room temperature and atmospheric pressure in the presence of platinum catalyst in the manner described in the preceding example. There was thus obtained 1-diethoxyacetyl-2-benzyl-hydrazine which, after recrystallisation from a mixture of benzene and petroleum ether, melted at 85°.

EXAMPE 10

1-(α-Hydroxypropionyl)-2-Iso-Propyl-Hydrazine

A mixture of 23.6 g. of ethyl lactate and 14.8 g. of iso-propyl hydrazine was refluxed for about 60 hours at an oil bath temperature of 120°. The reaction mixture was then concentrated in the vacuum of a water jet pump. The solid residue was recrystallised from ethyl acetate. There were thus obtained 15 g. of 1-(α-hydroxypropionyl)-2-iso-propyl-hydrazine of M.P. 102–103°.

We claim:
1. An acid hydrazide of the formula

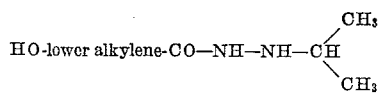

wherein the lower alkylene group is a saturated aliphatic hydrocarbon radical having from 1 to 4 carbon atoms.
2. 1-(hydroxyacetyl)-2-iso-propyl-hydrazine.
3. 1-(α-Hydroxypropionyl)-2-iso-propyl-hydrazine.
4. 1-(β-Hydroxypropionyl)-2-iso-propyl-hydrazine.
5. 1-(methoxyacetyl)-2-iso-propyl-hydrazine.
6. 1-(β-Ethoxypropionyl)-2-iso-propyl-hydrazine.
7. 1-(diethoxyacetyl)-2-iso-propyl-hydrazine.

References Cited in the file of this patent

UNITED STATES PATENTS

| | | |
|---|---|---|
| 2,572,867 | Karel | Oct. 30, 1951 |
| 2,767,173 | Katz | Oct. 16, 1956 |
| 2,912,461 | Donovan | Nov. 10, 1959 |

OTHER REFERENCES

Wieland: Hydrazine (1913), pp. 45, 46, 180.
Chem. Abstracts, vol. 12 (1918), pages 899—900.
Sidgwick: Org. Chem. of Nitrogen, Oxford University Press (London), (1937), pp. 398–399.
Degering: An Outline of Org. Nitrogen Compounds, University Lithoprinters (Ypsilanti) (1950), pp. 376, 378—379.
Byrkit: Ind. & Eng. Chem., 42, 1950, page 1864.
Yale et al.: J. Am. Chem. Soc., 75, 1953, page 1933.
Sheehan et al.: Journal Amer. Chem. Soc., vol. 77, pp. 1067—1068 (1955).
Sheehan: J. Org. Chem., 21 April 1956, pp. 439—440.